Patented Apr. 16, 1946

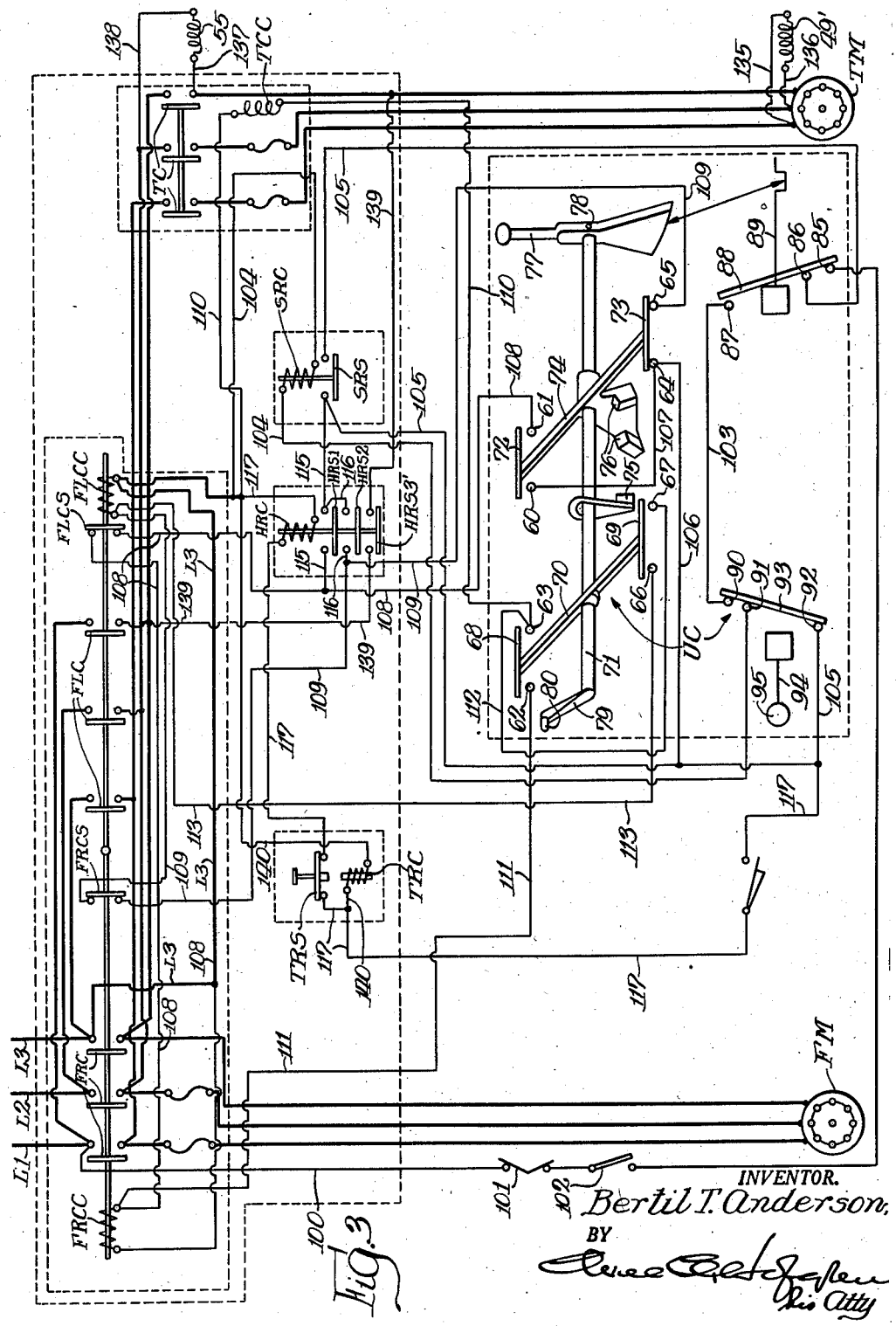

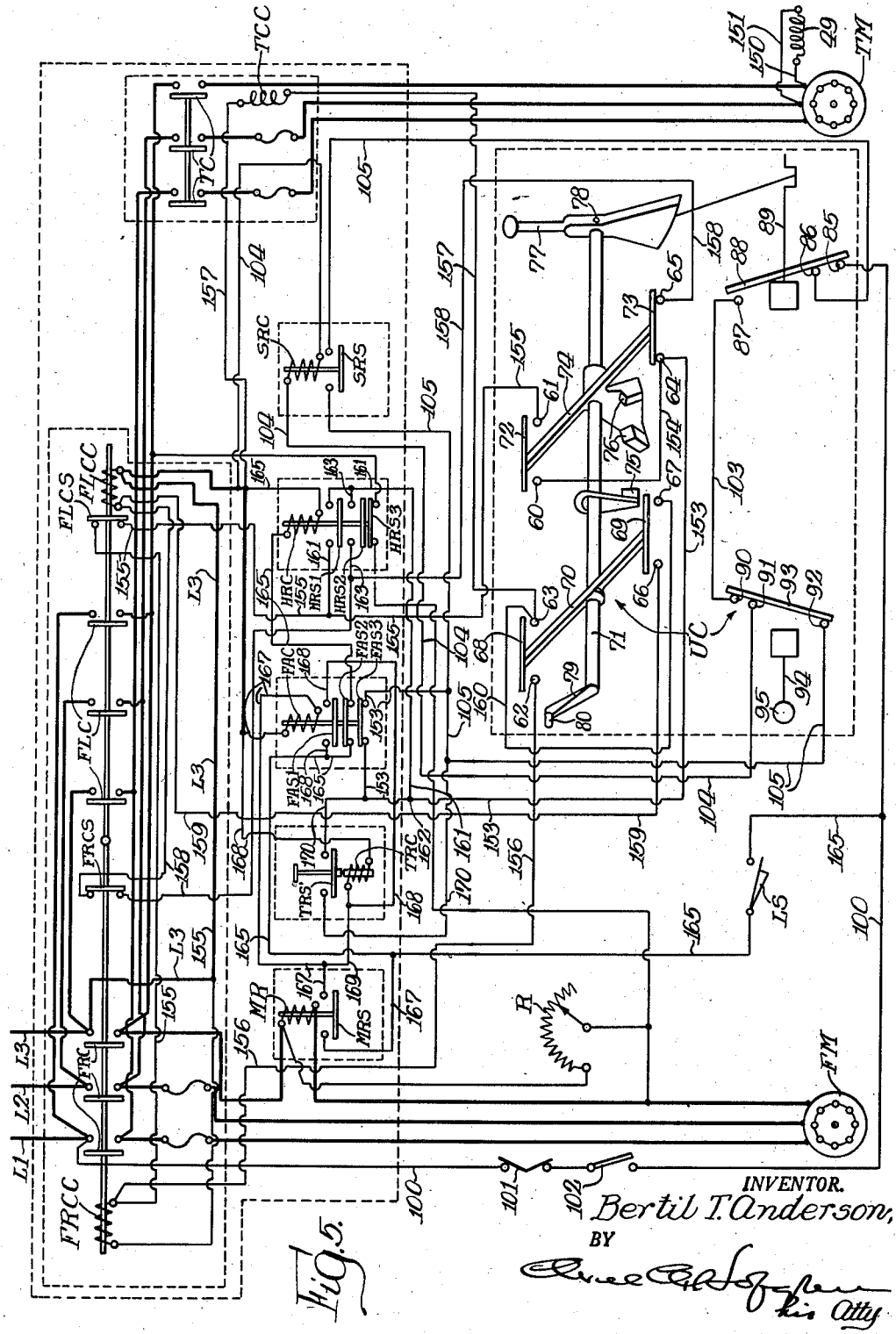

2,398,346

UNITED STATES PATENT OFFICE 2,398,346

CONTROL SYSTEM FOR MACHINE TOOLS

Bertil T. Anderson, Rockford, Ill., assignor to Sundstrand Machine Tool Co., Rockford, Ill., a corporation of Illinois Application December 19, 1942, Serial No. 469,529

17 Claims. (Cl. 90—21)

The invention relates generally to machine tools and more particularly to an electrical control system for a machine tool.

A general object of the invention is to provide a new and improved electrical control system for machine tools.

A more particular object is to provide a new and improved electrical control system permitting the obtaining of a positive stop and dwell.

Another object is to provide an electrical control system for obtaining positive stop and dwell wherein means actuated by the support just prior to engagement with the positive stop conditions the system for a reversal in the direction of support movement and also conditions a dwell timing means, the timing means exercising final control over the reversal.

Another object is to provide an electrical control system for obtaining positive stop and dwell wherein means actuated by the support just prior to engagement with the positive stop conditions a part of the system to respond to an overload on the support driving motor for relieving that overload and initiating the dwell timing means.

Other objects and advantages will become apparent from the following detailed description taken in connection with the accompanying drawings, in which:

Fig. 3 is a diagrammatic view of another form of electrical control system embodying the features of this invention.

Fig. 4 is a partial view showing a modified construction of the rapid traverse motor brake and latch employed with the form of control system shown in Fig. 3.

Fig. 5 is a diagrammatic view of a third form of electrical control system embodying the features of this invention.

Figure 1:
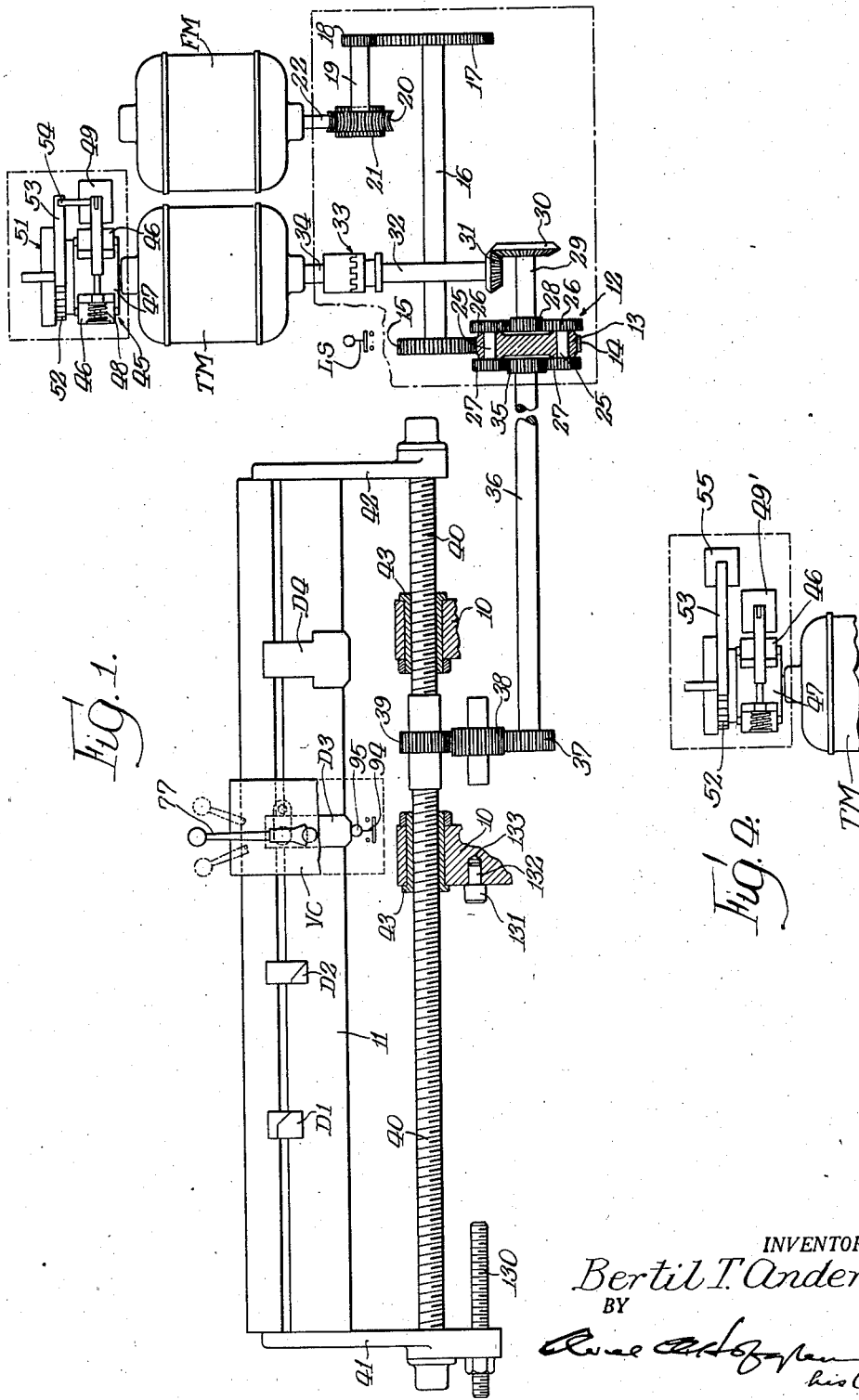
Fig. 1 is a diagrammatic view of a work support and driving motors and gearing therefor adapted to be controlled by the electrical control system herein disclosed.

While the invention is susceptible of various modifications and alternative constructions, it is here shown and will be described hereinafter in three embodiments. It is not intended, however, that the invention is to be limited to the specific forms disclosed, but on the contrary it is intended to cover all modifications and alternative constructions falling within the spirit and scope of the invention as defined by the appended claims.

Though the invention may be embodied in a variety of machine tools, it is, for purposes of disclosure, illustrated in the drawings and will hereinafter be described as embodied in a milling machine, by way of example, a machine such as that described in the patent to Bengt R. Granberg, No. 2,203,298, dated June 4, 1940. A machine of that character has a base or bed partially shown at 10 upon which is reciprocable in ways of conventional construction a work supporting carriage or table 11. Such a machine also has a tool support, usually in the form of a spindle. Inasmuch, however, as the spindle or its control form no part of this invention, no disclosure thereof is made herein.

As is well known to those skilled in the art, the carriage 11 is usually reciprocated through a cycle including various combinations of rapid traverse and feed movements. Herein the drive means for the carriage 11 is such that it may be driven both at a feed and a traverse rate of movement in either direction. Accordingly there is provided a reversible electric feed motor FM and a reversible electric traverse motor TM adapted to be started and stopped to start or stop movement of the carriage, and to be reversed to reverse the direction of movement of the carriage. These motors are connected to drive the carriage through a planetary gear device, generally designated 12. As disclosed herein the planetary gear device comprises a planet gear carrier 13 having teeth 14 formed on the periphery thereof. Meshing with the teeth 14 is a gear 15 fixed on one end of a shaft 16 the other end of which carries one gear 17 of a set of pick-off gears. The remaining gear 18 of the set of pick-off gears is fixed on one end of a shaft 19 the other end of which carries a worm wheel 20 meshing with a worm 21 fixed on the projecting end of the armature shaft 22 of the feed motor FM. The pick-off gears 17 and 18 are in well known manner changeable to vary the driving ratio of the feed motor.

Rotatably journaled in the planet gear carrier 13 are a plurality of stub shafts 25 spaced outwardly equal distances from the center of the planet gear carrier 13. Fixed on one end of each shaft is a planet gear 26 and fixed on the opposite end of each shaft is a planet gear 27. The planet gears 26 are in constant mesh with a sun gear 28 fixed on one end of a shaft 29 the other end of which carries a bevel gear 30. Meshing with the bevel gear 30 is a bevel gear 31 fixed on the end of a shaft 32, carrying on its other end a shiftable element of a clutch 33. Another element of the clutch is fixed on the armature shaft 34 of the rapid traverse motor TM. The planet gears 27, one the other hand, mesh with a sun gear 35 fixed on the end of a shaft 36 carrying a gear 37 on its other end. This gear in turn meshes with an idler gear 38 meshing with a driving gear 39 splined on a screw shaft 40 mounted to drive the carriage 11. Herein the screw shaft 40 is journaled at its ends in depending portions 41 and 42 of the carriage 11, and intermediate its ends threadedly engages nuts 43 nonrotatably secured in portions of the base 10. The driving gear 39 is also journaled in the bed but is held against longitudinal movement.

The carriage 11 is started and stopped at the beginning and ending of a cycle of movement by starting and stopping the feed and traverse motors, and is reciprocated in alternate directions by reversing the direction of rotation of the motors. A feed rate of movement of the carriage is obtained by operation of the feed motor while the traverse motor is held stationary, while traverse rate of operation of the carriage 11 is obtained by operation of the traverse motor with or without the feed motor being stationary. The worm 21 and the worm wheel 20 in the driving train from the feed motor to the planetary gear device serve as means preventing the feed motor from being driven through the planetary gear device during traverse rate of movement of the carriage, should the feed motor be deenergized, though herein the feed motor normally is running during traverse movement.

To hold the sun gear 28 stationary during feed movement of the carriage, joint braking means of the type more fully disclosed and claimed in the Bengt R. Granberg and John B. Sinderson Patent No. 2,145,255, dated January 31, 1939, are provided. Briefly this joint braking means comprises a brake, generally designated 45, and composed of a pair of pivoted brake shoes 46 adapted to act on a brake drum 47 fast on a projecting end of the motor armature shaft 34. The brake is normally applied by means of a spring 48 and is released by energization of a solenoid 49. Forming the other portion of the braking means is a mechanical latching means, generally designated 51, and comprising a notched disk 52 fixed on the projecting end of the motor armature shaft 34 and a pivoted latch 53 adapted to engage the notches in the disk, and thus positively hold the shaft against rotation should, under certain conditions, the frictional braking of the brake 45 not be sufficient. The latch 53 is yieldably urged toward engagement with the disk 52 and may be retracted as an incident to energization of the solenoid 49. Such a construction is disclosed in Fig. 1 and to that end there extends laterally from the brake releasing mechanism a pin 54. This pin overlies the end of the latch 53 and thus pivots and disengages the latch from the disk as the solenoid 49 releases the brake 45.

At times it may prove desirable to have the brake 45 and the mechanical latching means 51 separately operated. Such an arrangement is shown in Fig. 4. This is readily accomplished by omitting the pin 54 and by adding a separate solenoid 55 for actuating the latch 53.

To control the starting, reversing and stopping of the feed motor and the traverse motor, and the energization of one or both of the solenoids 49 and 55 to obtain the desired cycle of operation of the carriage, the control systems hereinafter described are provided. In addition to providing for conventional feed and traverse movements in either forward or reverse direction, it is a feature of this invention to provide for positive stop and dwell for an electrically driven and controlled carriage. As to this feature, the three control systems about to be described are common, though the particular manner of attaining that end varies. The systems are also common in many other respects and, to the degree practical, the common constructions of the systems will be described before each system is treated in detail and alone.

In all of the systems the feed motor FM and the traverse motor TM are connected in parallel and are primarily controlled as to starting and stopping and as to direction of rotation by means of a feed right contactor FRC and a feed left contactor FLC interposed in well known manner between the motors and the line wires of the power supply, which herein is a three wire system having the line wires L1, L2 and L3. The traverse motor is further and independently controlled as to starting and stopping by means of a traverse contactor TC which functions to interrupt the circuit to the traverse motor for the purpose of obtaining a feed rate of movement of the carriage and to complete the circuit to the traverse motor for obtaining a traverse rate of movement of the carriage. This traverse contactor, as is believed understood from the above, is interposed between the traverse motor and the feed right and feed left contactors so that the direction of rotation of the traverse motor will be under the control of these feed right and feed left contactors the same as the feed motor. Each the feed right contactor and the feed left contactor, in addition to the three switches controlling the three power lines, has a fourth switch that is normally closed when the respective contactor is open. This fourth switch for each contactor is designated, respectively, FRCS and FLCS and these switches are a part of the control portion rather than the power portion of the system, and will hereinafter be more fully treated as to their location and function.

Figure 2:
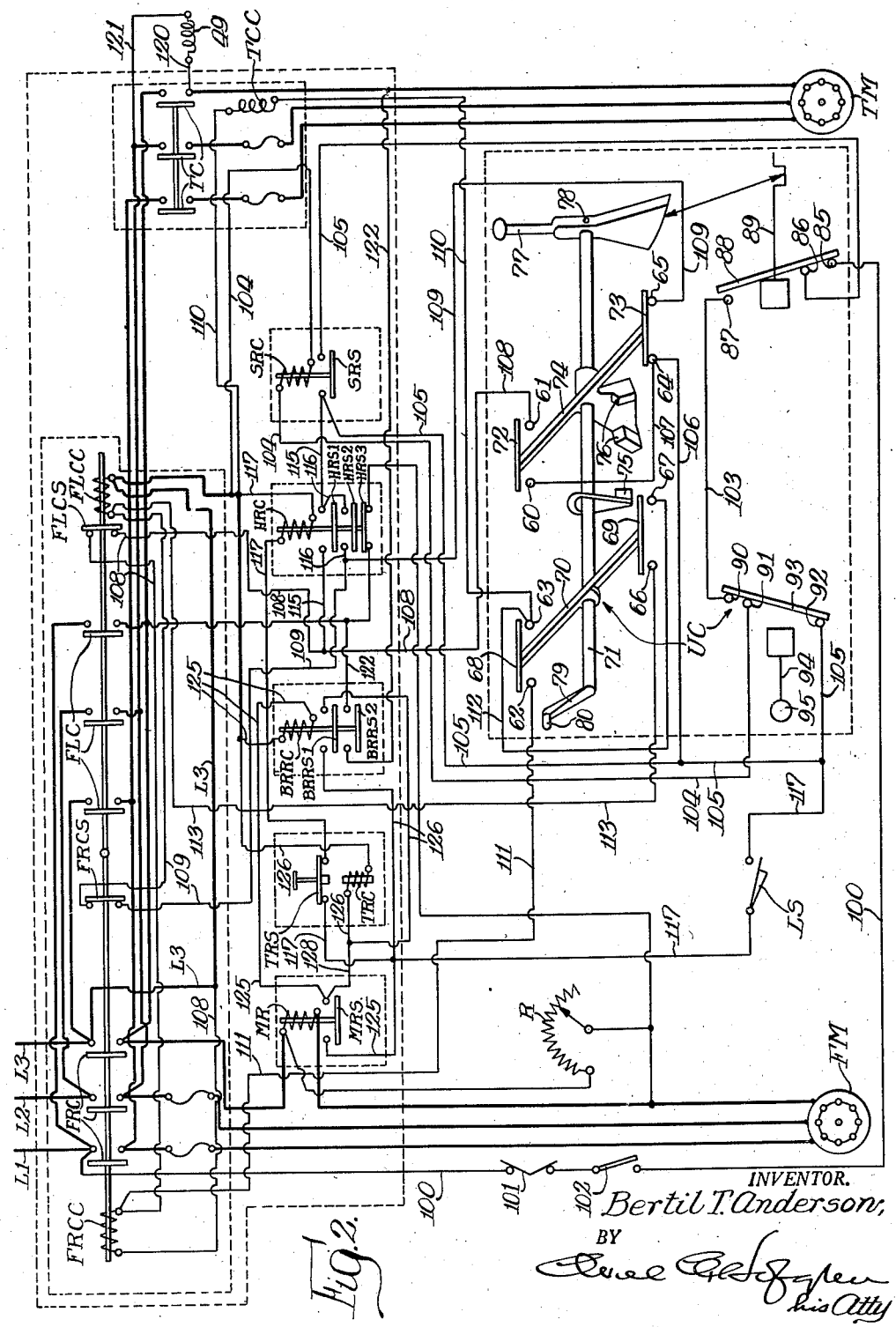
Fig. 2 is a diagrammatic view of one form of electrical control system embodying the features of this invention.

The left and right contactors for the feed and traverse motors, and the traverse contactor, are actuated electrically by means of a feed right contactor coil FRCC, a feed left contactor coil FLCC, and a traverse contactor coil TCC, respectively. In addition to the coils just described, there is an actuating coil SRC for a starting relay having a single, normally open switch SRS. There is also an actuating coil HRC, for what will herein be termed a holding relay, having three switches HRS1, HRS2 and HRS3. A time or timer relay has an actuating coil TRC and has a single switch TRS. The switches of these last two relays are in some of the systems normally open, while in others they are normally closed, and their normal position will be made known in the detailed description of the particular systems. Found only in the circuits disclosed in Figs. 2 and 5 is a relay that will hereinafter be designated the brake release relay, having an actuating coil BRRC and two switches BRRS1 and BRRS2.

Also forming a part common to all three systems is a unitary controller UC, having combined manual and automatic actuation and constituting the primary control means of the system. This unitary controller is shown diagrammatically in Figs. 2, 3 and 5, and in elevation in Fig. 1, and comprises generally a first control means including a plurality of switches herein associated with the feed left and feed right contactor coils and with the traverse contactor coil, thereby constituting a rate and direction control, a second control means including a plurality of switches adapted to be manually actuated and herein associated with the starting relay coil SRC and thereby constituting a start and stop control, and a third control means including switches herein adapted to be automatically actuated and also associated with the starting relay coil, and thereby constituting a limit or automatic stop control.

The unitary controller is claimed and described in detail in the Bengt R. Granberg Patent No. 2,203,297, dated June 4, 1940. It is believed, however, that the physical construction of the controller, to the extent required for an understanding of this invention, may be understood from the present disclosure, and the function and operation are, of course, clearly set forth. The rate and direction control herein is both manually and automatically operable and, moreover, is operable independently of the start and stop control and the automatic stop or limit control, and serves to condition the control circuit preparatory to initiation of operation of the driving means for the carriage. As previously stated, the rate and direction control comprises a plurality of switches associated with the feed right and feed left contactor coils and the traverse contactor coil. Herein the switches are four in number, as clearly seen in any of the Figures 2, 3 and 5, each consisting of two stationary contacts and a movable contact adapted to bridge the two stationary contacts. Four stationary contacts 60, 61 and 62, 63 are mounted in spaced relation longitudinally on one side of the controller. An additional four stationary contacts 64, 65 and 66, 67 are similarly mounted, but on the opposite side of the controller.

A movable contact 68 adapted to cooperate with the stationary contacts 62, 63 and a movable contact 69 adapted to cooperate with the stationary contacts 66, 67 are mounted on opposite ends of a T-shaped bracket 70 pinned to an oscillatable shaft 71 extending longitudinally of the controller and journaled in the end walls of the casing housing the controller. Similarly, a movable contact 72 and a movable contact 73 are mounted on opposite ends of a T-shaped bracket 74 which is loosely mounted upon the shaft 71. The contacts 72 and 73 are adapted to cooperate, respectively, with the stationary contacts 60, 61 and 64, 65. Though not here shown, each of the movable contacts 68, 69, 72 and 73 is yieldably mounted on its respective bracket 70 to 74.

The bracket 70 has three positions, namely, a neutral position, which is that shown in Figs. 2, 3 and 5, and in which both movable contacts 68 and 69 are disengaged from the stationary contacts, and an extreme position on either side of neutral in which one of the switches is closed by engagement of a movable contact with the stationary contacts, while the other switch remains open depending to which extreme position the bracket is swung. The bracket 74 has but two positions, namely, a right position and a left position. With the bracket in its left position, as shown in Figs. 2, 3 and 5, movable contact 73 engages and bridges contacts 64, 65, while movable contact 72 is disengaged from its cooperating stationary contacts. When the bracket 74 is swung to its right position, just the reverse is true. The brackets are yieldably retained in their various positions by suitable means, such as star wheel portions each formed with the requisite number of notches and engaged by spring pressed followers.

It has been previously stated, that the bracket 70 is pinned to the shaft 71, while the bracket 74 is loose upon the shaft. In order to obtain a unique movement of the brackets 70 and 74, which particularly adapts the controller for use with machine tools and for the systems herein disclosed, the bracket 74 is actuated by the bracket 70 through a lost motion connection. This lost motion connection is of such nature that when the bracket 70 is swung to either extreme position the bracket 74 also is swung in the same direction, but, when the bracket 70 is merely returned from either extreme position to its neutral position, no movement is imparted to the bracket 74. The lost motion connection comprises a lug 75 disposed centrally with respect to the bracket 70 and extending axially to project between spaced lugs 76 carried by the bracket 74 and extending axially so as to overlap the lug 75. It will be seen with the foregoing arrangement that upon rotation of the bracket 70 to its extreme position in a clockwise direction, as viewed from the right end in Figs. 2, 3 and 5, both contact 68 and 72 will engage their respective, stationary contacts and that bracket 70 may then be rotated in a counterclockwise direction to its neutral position, thereby disengaging movable contact 68, while contact 72 remains in engagement with its contacts 60 and 61. Similarly the bracket 70 may be swung to its extreme position in the opposite direction and then returned to neutral, in which event it will carry with it the bracket 74 when swung to the extreme position, but will not carry with it the bracket 74 when it is returned to its neutral position.

In order that the shaft 71 may be oscillated both manually and automatically, it projects at both ends from the casing of the controller, and at its right hand end, as viewed in Figs. 2, 3 and 5, which will herein be called the forward end, carries a lever 77 secured to the shaft by a pivot pin 78 extending diametrically of the shaft so as to be held against rotation relative thereto, while permitting pivoting of the lever in the plane of the shaft. At the opposite or rear end, the shaft 71 has nonrotatably secured thereto an arm 79 carrying a follower 80 for actuation by dogs mounted on the carriage 11, as will later be described.

The manual start and stop control means is designed to be actuated by the lever 77 through the pivoting of the lever upon the pin 78 and thus independently of the movement of the lever for rocking the shaft 71 in actuating the rate and direction control. To that end, the manual start and stop control comprises two switches formed by three stationary contacts 85, 86 and 87 and a movable contact 88 in the form of a tiltable plate provided with contact points positioned to cooperate with the stationary contacts. The particular construction of this switch means is fully disclosed in the Granberg Patent No. 2,203,297 above mentioned. Suffice it to say, therefore, that the movable contact 88 is normally so held as to be in engagement with stationary contacts 85 and 86, but out of engagement with contact 87 and, through movement of a plunger 89 actuated by the lever 77, may be caused to engage contact 87 or be disengaged from all three contacts. Movement of the plunger 89 to the left, as viewed in Figs. 2, 3 and 5, causes engagement of the movable contact 88 with the contact 87, while movement of the plunger to the right results in breaking of all of the switches controlled by the movable contact 88.

At the opposite end of the controller is the automatic stop or limit control means. Like the manual start and stop control, this automatic stop control comprises two switches formed by three stationary contacts 90, 91 and 92, and a movable contact 93 in the form of a plate. Here again, suffice it to say that the movable contact 93 has a normal position in which it is in engagement with all three stationary contacts and that it is adapted by a plunger 94 to be disengaged from the stationary contact 92 while remaining in engagement with contacts 90 and 91. The plunger 94 carries a follower 95 for actuation by dogs on the carriage. This construction is also more fully disclosed and claimed in the same Granberg Patent No. 2,203,297.

Having described the contactors, relays, unitary controller, switches, and so forth, common or partially common to the three embodiments of the invention herein disclosed, the specific connection of these parts in the control circuits will now be described. Turning first to the forms of the invention shown in Figs. 2 and 3, there extends from the line wire L1 a lead 100 connected to the stationary contact 85. Connected in this lead is a switch 101 which is a thermal, overload switch for all of the motors and a manual switch 102 which is a safety switch. Interconnecting the stationary contacts 87 and 90 is a lead 103 forming part of a start or initiating circuit. Forming a part of this same circuit is a lead 104 connected at one end to the stationary contact 91 and at the other end to the line wire L3. Incorporated in this lead is the coil SRC of the start relay. This starting circuit includes the normally closed switch formed by the stationary contacts 90, 91 and the movable contact 93 of the automatic stop control means, the normally closed switch formed by the stationary contacts 85, 86 and the movable contact 86 of the manual start and stop control means, and the normally open switch of that same means formed by the stationary contact 87 and the movable contact 88. Thus it will be seen that under normal conditions movement of the plunger 89 to the left by pivoting of the lever 77 in a clockwise direction will close the switch 87, 88 and thereby complete a starting circuit energizing the coil SRC of the starting relay. This relay, as already stated, has a single normally open switch SRS which will now be closed upon energization of the relay coil. This switch SRS is in a lead 105 connecting the stationary contacts 86 and 92 which lead, together with the switch, completes a holding circuit for the coil SRC that may be traced as follows: Lead 100, closed switch 85, 86, 86, lead 105 with the now closed switch SRS, normally closed switch 91, 92, 93, and lead 104 to the line wire L3.

In addition to controlling this holding circuit for the coil SRC of the start relay, the switch SRS also controls all of the other sub-circuits of the control circuit proper. To that end there is connected to the lead 105 beyond the switch SRS, that is, intermediate the switch and the stationary contact 92, a lead 106 which extends to the stationary contact 64 of the unitary controller. Contact 64 is interconnected with contact 60 of the controller by a lead 107. The remaining contact 61 of the pair of contacts 60, 61 is by a lead 108 connected to the line wire L3 and has incorporated therein the coil FRCC of the feed right contactor FRC. Also incorporated therein is the normally closed switch FLCS of the feed left contactor.

The coil FLCC of the feed left contactor is connected in a sub-circuit generally parallel with that of the feed right contactor coil and comprises a lead 109 connected at one end to the stationary contact 65 and at the other end to the line wire L3. This lead has incorporated therein the normally closed switch FRCS of the feed right contactor and the coil FLCC of the feed left contactor. Also under the control of the unitary controller UC and in general parallelism with the sub-circuits including the feed right and feed left contactor coils is the sub-circuit for the traverse contactor coil TCC. This circuit includes a lead 110 connected at one end to the line wire L3 and at the other end to the stationary contact 63 and having incorporated therein the traverse contactor coil TCC. Stationary contact 62 is by lead 111 connected to the lead 108 intermediate the feed right contactor coil and the feed left contactor switch FLCS to complete a circuit for the energization of the traverse contactor coil when the unitary controller is swung to the extreme position wherein the movable contact 68 bridges the stationary contact 62, 63. Stationary contact 63 is also by lead 112 connected to the stationary contact 67, while contact 66 is by lead 113 connected to the lead 109 intermediate the feed left contactor coil and the feed right contactor switch FRCS to complete a circuit for energizing the traverse contactor coil when the unitary controller is swung to the extreme in the opposite direction, causing the movable contact 69 to bridge stationary contacts 66, 67.

It is believed apparent from the above that by rocking the shaft 71 through the medium of the lever 77 the unitary controller is operable to precondition the control system to bring about movement of the carriage 11 in either direction and at either feed or traverse rate at the time the plunger 89 is moved to the left to permit completion of the starting circuit by closure of the switch through the contacts 87, 88. Thus if the shaft 71 is rocked to its extreme position, for example, to the right as viewed from the right in Fig. 2, so that both the movable contacts 68 and 72 will engage and bridge their respective stationary contacts, circuits will be conditioned to energize both the feed right contactor coil FRCC and the traverse contactor coil TCC if, while in that position, the lever 77 is pivoted to move the plunger 89 to the left. Such energization of these coils will in turn cause closure of the feed right contactor FRC and the traverse contactor TC and thus cause operation of both the feed and the traverse motors to drive the carriage at a traverse rate to the right as viewed in Fig. 1. Had the unitary controller been returned partially to its neutral position, so that the movable contact 68 would no longer have bridged stationary contact 62, 63 before the plunger 89 was actuated, only the feed right contactor coil FRCC would have been energized and hence only the feed right contactor FRC closed, with the result that the carriage would have been driven at a feed rate to the right, as viewed in Fig. 1. Conversely, when the unitary controller is swung to its extreme position in the opposite direction, that is, counterclockwise, as viewed from the right in Fig. 2, movable contacts 69 and 73 will bridge contacts 66, 67 and 64, 65, respectively, and will condition circuits for the traverse contactor coil TCC and for the feed left contactor coil FLCC. If then, while in this position, the plunger 89 is moved to the left to close switch 87, 88, these coils will be energized and the feed left contactor and the traverse contactor closed to again drive the carriage at a traverse rate, but this time to the left, as viewed in Fig. 1, because the direction of rotation of the motors has been reversed due to the supply of power thereto through the feed left contactor rather than the feed right contactor. Again movement of the carriage to the left at a feed rate might be initiated if the unitary controller were partially returned toward neutral position to break the circuit for the traverse contactor coil through the switch 66, 67, 69, while preserving the circuit for the feed left contactor coil through switch 64, 65, 73. It will be understood, of course, that operation of the motor may be arrested at any time by manual shift of the plunger 89 to the right, as viewed in Figs. 2, 3 and 5, thereby breaking the holding circuit for the starting relay at the switch 85, 86, 88. Similarly, operation may be arrested automatically by shift of the plunger 94 to the right, breaking the holding circuit at the switch 91, 92, 93. The plunger 94, as previously mentioned, and as will hereinafter be more fully described, is adapted to be actuated by dogs on the carriage 11.

It is a feature of this invention to provide a construction or arrangement whereby, while the carriage 11 continues to be driven at a feed rate in one direction, the unitary controller may be actuated to precondition the system for traverse movement of the carriage in the opposite direction. To that end, holding circuits are provided for the feed right and feed left contactor coils. These holding circuits are under the control of the holding relay, and more particularly under the control of its two normally open switches HRS1 and HRS2. The holding circuit for the feed right contactor coil comprises simply a single lead 115 connected at one end to the lead 105 intermediate stationary contact 92 and switch SRS, and at the other end to the lead 108 intermediate the stationary contact 61 and the feed left contactor switch FLCS, and having incorporated therein the holding relay switch HRS1. The holding circuit for the feed left contactor coil comprises a single lead 116 having incorporated therein the switch HRS2, and connected at one end to the lead 115 intermediate lead 105 and switch HRS1, and at the other end to the lead 109 intermediate the contact 65 and the feed right contactor switch FRCS. The energizing circuit for the coil HRC of the holding relay comprises a lead 117 connected at one end to the lead 105 intermediate stationary contact 92 and switch SRS, and at the other end to the line wire L3. This lead has incorporated therein a dog actuated, normally open, limit switch LS and the normally closed timer relay switch TRS.

As previously stated, the primary object of this invention is to provide for positive stop and dwell in an electrically driven and electrically controlled system. In the form of the invention shown in Fig. 2, this object is attained through a construction whereby the carriage is held against the positive stop by continued operation of the feed motor, but injury to the mechanism prevented by permitting the feed motor to drive the traverse motor during the period of the dwell. To that end, there is incorporated in one of the line wires supplying power to the feed motor an instantaneous type, magnetic, overload relay MR. Connected in parallel with the relay are the normally closed switch HRS3 of the holding relay and a rheostat R. It will be apparent that during normal operation, that is, prior to the time that the limit switch LS is closed, the switch HRS3 will be closed and thus form a shunt around the overload relay MR, preventing the same from being tripped by the normal flow of current required for driving the carriage at either a traverse or a feed rate. When the switch HRS3 is opened, however, a part of the current flows through the relay and a part flows through the rheostat, thus rendering the relay responsive to the load on the feed motor as indicated by the quantity of current flowing to the motor. By varying the adjustment of the rheostat, the tripping of the magnetic overload relay can be adjusted to carry the normal load required to drive the table and to occur only upon a predetermined overload. The solenoid 49, which in this form of the invention is constructed as shown in Fig. 1, namely, as adapted to release, when energized, both the brake means 45 and the mechanical latching means 51, is here connected in parallel with the traverse motor TM. To that end, a lead 120 extends from one end of the solenoid 49 to one of the line wires and is connected thereto intermediate the traverse contactor and the traverse motor. The other end of the solenoid 49 is by a lead 121 connected to a different one of the line wires at a point intermediate the traverse contactor and the feed right and feed left contactors. This circuit arrangement assures that the solenoid 49 will be energized to release the brake means and the mechanical latching means whenever the traverse motor is operating. An additional circuit is provided, however, to permit energization of the solenoid 49, and hence release of the brake means and the mechanical latching means independently of operation of the traverse motor. To that end a lead 122 is provided. This lead is connected at one end to the lead 120 or to the same terminal of the solenoid 49 to which the lead 120 is connected, and at the other end to the same line wire that the lead 120 is connected to, but this side of the traverse contactor so as to be freed from control by the traverse contactor. Incorporated in this lead 122 is one of the switches BRRS2 of the brake release relay.

The magnetic relay MR has a single, normally open switch MRS which functions to initiate operation of the timing relay, as well as the release of the braking means for the traverse motor. To that end, the switch MRS is, along with the brake release relay coil BRRC, connected in a branch lead 125 of a parallel circuit. The other branch lead 126 of this parallel circuit has connected therein the normally open switch BRRS1 of the brake release relay and the coil TRC of the timer relay. At one end the leads 125 and 126 are joined and connected to the lead 117 intermediate the limit switch LS and the timer relay switch TRS, the other ends of the leads 125 and 126 being connected to the line wire L3. A lead 128 interconnects the leads 125 and 126 at points, respectively, intermediate the switch and the coil in each lead. It is believed apparent that the switch MRS of the magnetic relay serves initially to energize the coils of the timer relay and the brake release relay, while the switch BRRS1 serves to complete a holding circuit maintaining these coils energized when the switch MRS is again opened as will be the case as soon as the overload on the feed motor is removed. After a dwell of predetermined length, determined by adjustment of the timer relay, the normally closed switch TRS of this relay is opened to deenergize the holding relay coil HRC and thereby permitting the table to be reversed and driven at a traverse rate in the opposite direction, as will presently be more fully pointed out in the description of the operation of the system in the form shown in Fig. 2.

Having described the system, it is believed that the invention can be further clarified and rendered more readily understandable by a brief description of the operation for this form of the invention. It is to be understood, of course, that a great number of different cycles of operation are obtainable with the system herein disclosed. These cycles may be arranged to obtain the so-called skip-feed milling, or the so-called double end milling, and it is to be understood that the invention is not to be limited to the one cycle hereinafter employed by way of exemplary disclosure. For simplicity, let it be assumed that the carriage 11 is to have a cycle composed of a traverse to the right, followed by a feed movement to the right, a dwell, and then a reversal and a traverse movement to the left back to its initial starting position. Under these conditions, the left end of the carriage, as viewed in Fig. 1, will have adjustably mounted therein a positive stop screw 130. Positioned to be abutted by the screw to hold the carriage against further movement to the right is a steel plug 131 having a reduced portion 132 inserted into a recess 133 formed in the bed or base 10 of the machine. Mounted on the carriage will be four dogs D1, D2, D3 and D4, suitably spaced longitudinally of the carriage. The dogs D1 and D2 are designed to act upon the follower 80 carried by the shaft 71 of the unitary controller UC. The dog D1 functions to rock the controller from its feed right position, shown in Fig. 2, to its traverse left position, that is, with the movable contacts 69 and 73, respectively, bridging their associated stationary contacts. The dog D2 functions to rock the unitary controller from its traverse right position to its feed right position, which is the position shown in Fig. 2. The dog D3 is adapted to engage the follower 95 on the plunger 94 and cause opening of the switch 91, 92, 93 which will arrest operation of the motors and bring the carriage to a stop. The dogs may thus be known by their functions, namely, respectively, as the traverse left dog, the feed right dog, and the stop dog. The dog D4 acts to control the limit switch LS and is so positioned as to close the limit switch just a brief interval prior to engagement of the stop screw 130 with the base 10 of the machine and also prior to engagement of the dog D1 with the follower 80 of the unitary controller, and to maintain the limit switch closed until traverse movement to the left has been initiated.

Let it be assumed, therefore, that the carriage 11 is in its normal or stop position, as shown in Fig. 1, and that it is desired, and the dogs D1 to D4 have been set up, to produce the cycle above described. To initiate movement of the carriage 11 to the right at a traverse rate, the operator grasps the lever 77 and swings the same to its extreme right position, as viewed in Fig. 1, to condition energizing circuits for the feed right contactor coil FRCC and the traverse contactor coil TCC by closure of the switches 60, 61, 72 and 62, 63, 68, respectively. The circuits may be traced as follows: Lead 100, closed switch 85, 86, 88, lead 105 containing the normally and hence now open switch SRS of the starting relay, lead 106, lead 107, switch 60, 61, 72, and lead 108 containing the now closed switch FLCS of the feed left contactor and coil FRCC of the feed right contactor; leads 100 and 108 being connected, respectively, to the line wires L1 and L3. The circuit for the traverse contactor coil is common with the circuit for the feed right contactor coil to the point beyond the feed left contactor switch FLCS where lead 111 branches off to the stationary contact 62. The circuit is completed by the movable contact 68, the stationary contact 63, and lead 110 which includes the traverse contactor coil TCC and is connected to the line wire L3. Because of the presence in the common portion of these conditioned circuits of the still open switch SRS, the feed right and traverse contactors are, of course, not closed and hence no operation of the motors and no movement of the carriage takes place. While still holding the lever 77 swung to its extreme right position, as viewed in Fig. 1, the operator next pivots the lever in a clockwise direction, as viewed in Fig. 2, to force plunger 89 inwardly and permit closure of the switch by engagement of contact 87 by the movable contact 88. This completes the energizing circuit for the starting relay coil SRC. The circuit may be traced as follows: Lead 100, switch 85, 86, 88, movable element 88 now in engagement with contact 87, lead 103, the closed switch 90, 91, 93, and lead 104 which contains the coil SRC. It is to be noted that this starting circuit may be completed even though the dog D3 still holds the plunger 94 depressed to break the holding circuit for the starting relay coil at 92, for the starting circuit remains closed at the switch 90, 91, 93. Energization of the relay coil SRC closes the switch SRS which completes the preconditioned circuits to the feed right contactor coil and the traverse contactor coil, thereby initiating operation of both the feed and the traverse motors in such direction as to cause movement of the carriage at a traverse rate to the right. Solenoid 49 being connected in parallel with the traverse motor will be energized to release the braking mechanism even though the switch BRRS2 remains open. With the first movement of the carriage to the right, the dog D3 releases the plunger 94 and movable element 93 of the automatic control means engages stationary contact 92 to complete the holding circuit for the start relay coil and the operator may then release the lever 77.

The carriage will continue its movement to the right at a traverse rate until the dog D2 engages the follower 80 and rocks the shaft 71 of the unitary controller to its feed right position, which is the position shown in Fig. 2. Such rocking of the shaft 71 breaks the circuit to the traverse contactor coil TCC because the movable contact 68 no longer bridges stationary contact 62, 63. Because of the lost motion connection between the lug 75 fixed on the shaft 71 and the lugs 76 on the bracket 74, this return of the shaft 71 to its neutral position does not affect the bracket 74 and hence the carriage will continue to move to the right at a feed rate.

While the carriage is thus moving to the right at a feed rate, and at a suitable time prior to engagement of the dog D1 with the follower 80, the dog D4 closes the limit switch LS. Such closure of the limit switch LS will energize the coil HRC of the holding relay and this relay will in turn establish a holding circuit for the feed right contactor coil independent of the unitary controller, and thus permit conditioning of the unitary controller for reversal of the carriage and movement to the left at a traverse rate, though the carriage continues in its movement to the right to complete that half of its cycle. The circuit for the holding relay coil HRC may be traced as follows: Lead 100, closed switch 85, 86, 88, lead 105 containing the now closed switch SRS, and lead 117 containing the now closed limit switch LS and the normally closed timer relay switch TRS. The holding circuit for the feed right contactor coil may be traced as follows: Lead 100 to lead 105 as just traced, lead 115 branching from the lead 105 and containing the now closed switch HRS1 of the holding relay, and lead 108 containing the still closed switch FLCS of the feed left contactor. A similar holding circuit for the feed left contactor coil is under the control of the second switch HRS2 of the holding relay and is composed of the lead 116 which incorporates the last named switch. Though the switch HRS2 is now closed, energization of the feed left contactor coil cannot take place because the switch FRCS of the feed right contactor is now open.

Following closure of the limit switch LS the dog D1 comes into play and rocks the shaft 71 of the unitary controller to its extreme left position, as viewed in Fig. 1. As a result, the unitary controller conditions circuits for the feed left contactor coil and the traverse contactor coil. These circuits may be traced as follows: Lead 100, manual stop switch, lead 105 containing the now closed switch SRS, lead 106, the now closed switch formed by the contacts 64, 73, 65, and lead 109 containing the feed left contactor coil FLCC and also containing the feed right contactor switch FRCS. The circuit for the traverse contactor coil is common to a point beyond the switch FRCS where it branches off from the lead 109 and is composed of a lead 113, now closed switch 66, 69, 67, lead 112, and lead 110. These circuits are not completed because the feed right contactor switch FRCS connected in the common portion of both circuits is still open. This positioning of the unitary controller in its traverse left position, while still obtaining movement of the carriage to the right at a feed rate, is made possible by the provision of the holding circuit for the feed right contactor coil, such circuit being governed as above described by the holding relay which in turn is under the control of the limit switch LS and the switch TRS of the timer relay.

Energization of the coil HRC of the holding relay by closure of the limit switch LS, in addition to completing a holding circuit for the feed right contactor coil, also rendered the magnetic relay MR responsive to the load on the feed motor. When the coil HRC of the holding relay was energized, the normally closed switch HRS3 of this relay was opened, thereby removing the shunt around the magnetic relay MR and causing the current flowing to the feed motor to be carried by the relay and the rheostat R. Now as the stop screw 130 positively arrests further movement of the carriage 11 to the right, the load on the feed motor is increased until the overload builds up to the point where it trips the relay MR. Such tripping of the relay MR closes its normally open switch MRS to complete an energizing circuit for the coil BRRC of the brake release relay and the coil TRC of the timer relay. With the energization of the coil for the brake release relay, its normally open switch BRRS1 is closed to complete a holding circuit for both the brake release and the timer relays. Simultaneously, the second of the normally open switches of the brake release relay is closed, this being the switch BRRS2 which completes a circuit to the solenoid 49 independ-ently of energization of the traverse motor TM. Energization of the solenoid releases the brake mechanism and thus releases the load on the feed motor by allowing the feed motor to rotate the traverse motor through the planetary gearing. As a result, the carriage is thus given a dwell period while it remains in its extreme right position.

After the desired dwell, determined by setting of the timer relay, the timer relay switch TRS opens, breaking the circuit to the coil HRC of the holding relay and thereby opening the switch HRS1 in the holding circuit for the feed right contactor coil, and with deenergization of this coil the feed right contactor will be opened. Circuits had, however, previously been conditioned as above described for energization of the feed left contactor coil and the traverse contactor coil. With return of the feed right contactor FRC to its normal position, the switch FRCS will be closed and thus complete these preconditioned circuits to the feed left and the traverse contactor coils. Thereupon, both the feed left contactor and the traverse contactor will be closed causing both the feed motor and the traverse motor to operate in a direction driving the carriage at a traverse rate to the left. In such movement the dog D4 will no longer exercise control over the limit switch LS which will then return to its normal, open position and the timer relay will restore its switch TRS to its normal, closed position. When the carriage reaches its normal or starting position, the dog D3 will actuate the plunger 94 to break the holding circuit for the coil SRC of the starting relay, which will in turn open its switch SRS breaking the circuits to the feed left and traverse contactor coils, and the carriage will come to rest in its initial position.

The form of the invention shown in Fig. 3 differs from that disclosed in Fig. 2 in the manner of obtaining the dwell, more particularly in the manner of preventing injury to the mechanism while the table is positively arrested by the stop screw 130 and before reversal takes place. With that exception, the construction is the same as that disclosed in Fig. 2 and the manner in which the various controllers, switches, and relay coils are connected in circuit is also the same. Thus, as to this common construction, the system here disclosed has already been described. This portion of the specification will therefore be directed only to the modified portion of this form of the invention.

In this form of the invention, the magnetic overload relay MR, the rheostat R, and the brake release relay are eliminated, together with the switches forming a part thereof, and in place of the single solenoid 49 controlling both the friction brake means 45 and the mechanical latching means 51, the modified construction shown in Fig. 4 is employed. There is thus provided a solenoid 49' which controls only the frictional brake means 45 serving to release the frictional brake means when the solenoid is energized. This solenoid is connected in parallel with the traverse motor having the ends of the solenoid winding connected by leads 135 and 136 directly to terminals on the traverse motor, so as to be energized when the motor is energized and deenergized when the motor is deenergized.

The latching means 51 is now independently controlled by the solenoid 55, and the winding of this solenoid is so connected in circuit that the solenoid will be energized to release the mechanical latching means whenever the traverse motor is energized, and so that it may be independently energized to release the latching means at times when the traverse motor is not energized. To that end, one terminal of the winding of the solenoid is by lead 137 connected to one terminal of the traverse motor while the other terminal of the solenoid winding is by a lead 138 connected to the power leads intermediate the feed left and feed right contactors and the traverse contactor. It will thus be seen that through this circuit the solenoid 55 will be energized whenever the traverse contactor TC is closed to energize the traverse motor. For independent energization of the solenoid, the first mentioned terminal, that is, the one to which the lead 137 is attached is by lead 139 also connected to one of the power leads between the traverse contactor and the feed right and feed left contactors, the same as the lead 138. It is understood, of course, that the leads 138 and 139 will be connected to different power leads. Incorporated in this lead 139 is a switch HRS3' of the holding relay. This third switch of the holding relay is here a normally open switch, whereas in Fig. 2 it was a normally closed switch. With this change in construction and with the elimination of the brake release relay and its coil BRRC, the coil TRC of the timer relay is in this form of the invention incorporated in a single lead 140 connected at one end to the line wire L3 and at the other end to the lead 117 between the limit switch LS and the switch TRS of the timer relay, the same as in Fig. 2.

The operation of the invention in this form is the same as in the form disclosed in Fig. 2 up to the point where the dog D4 acts on the limit switch LS to close the same. Closure of the limit switch LS in Fig. 3 will still energize the coil HRC of the holding relay and thus cause a closing of the normally open switches HRS1 and HRS2 of the relay to establish holding circuits for the feed right contactor coil FRCC or the feed left contactor coil FLCC, depending upon which is then energized independently of the unitary controller as pointed out in connection with the circuit of Fig. 2. Such actuation of the holding relay will also result in closure of the switch HRS3', causing the solenoid 55 to be energized and the mechanical latching means 51 withdrawn to free the traverse motor of this positive mechanical rotation arresting means, while leaving the frictional brake means applied. This frictional brake means is normally sufficient to hold the traverse motor against the reaction of the planetary gearing tending to cause rotation thereof, and thus the feed motor will continue to drive the carriage 11 to the right at a feed rate. Such continued movement of the carriage will cause the dog D1 to engage the follower 80 and rock the unitary controller to its extreme left position, as viewed in Fig. 1, which is its traverse left position. For the reasons pointed out in connection with the circuit of Fig. 2, no change in the motor operations takes place and hence the carriage still continues its movement to the right at a feed rate. Finally the positive stop screw 130 strikes the base 10 of the machine and thus positively arrests the carriage. At this time the friction brake means, though still applied, is not sufficient to hold the traverse motor against rotation, and the feed motor now drives the traverse motor through the planetary gearing, thereby permitting the carriage to remain stationary though the feed motor continues to operate.

Closure of the limit switch LS also energized the coil TRC of the timer relay and thus set that relay into operation. After a suitable period, the timer relay will open its normally closed switch TRS and thus break the circuit to the coil HRC of the holding relay causing the three switches of this relay to again return to their normal, open position. This will then break the circuit to the feed right contactor coil FRCC and with return of the feed right contactor to its normal position will close its switch FRCS, which will then complete the preconditioned circuits to the feed left and the traverse contactor coils FLCC and TCC. Under these conditions, both the feed and the traverse motors will now be operating and both the solenoid 49' and the solenoid 55 will be energized to release both the frictional and the mechanical braking means, so that the carriage will be driven at a traverse rate in a reverse direction, that is, to the left as viewed in Fig. 1, until the dog D3 arrests such movement of the carriage in its normal position by engagement with the follower 95 of the plunger 94 which actuates the automatic stop switch 91, 93, 92. It will be appreciated that in this form of the invention the timer relay is adjusted to a period which will cover the dwell desired, as well as the time required to move the carriage from the point of engagement of the dog D4 with the limit switch LS to the end of its movement to the right.

In the form of the invention shown in Fig. 5, positive stop and dwell are obtained in still another manner, more particularly, by actually stopping the feed motor. This stopping of the feed motor is again under the control of the magnetic relay which is made responsive to an overload on the feed motor by closure of the switch LS. The system, therefore, is basically similar to that disclosed in Fig. 2 and includes, as already described as common structure, the feed motor FM, the traverse motor TM, the feed right contactor FRC, the feed left contactor FLC, the traverse contactor TC, their respective actuating coils FRCC, FLCC and TCC, and the unitary controller UC. This form of the invention also includes the magnetic relay MR and the rheostat R connected in the circuit of the feed motor as described in connection with the showing of Fig. 2, the solenoid 49, and the starting relay and holding relay with their respective coils SRC and HRC, and with the same number and character of switches. A timer relay with its coil TRC is also found in this form of the invention, but in place of a normally closed switch has a normally open switch TRS'. Connected in circuit, as was coil BRRC of the brake release relay, is the coil FAC of a relay which will for convenience be referred to as the feed motor arresting relay. This relay has a normally open switch FAS1 and two normally closed switches FAS2 and FAS3.

In this form of the invention, the solenoid again controls both the frictional brake means 45 and the mechanical latching means 51, and the winding of the solenoid is, moreover, so connected as to be energized when the traverse motor is energized and deenergized whenever the traverse motor is not operating. To that end, leads 150 and 151 connect the ends of the solenoid winding to terminals on the traverse motor. The starting and holding circuits for the coil SRC of the starting relay are the same in this form as in the other two forms, and thus will not again be traced. While the circuits for the coils of the other relays and the contactors are to a large degree also connected in sub-circuits similar to those of Fig. 2, there are certain departures and hence it is deemed desirable briefly to describe the circuit connections for these coils. The energizing circuit for the feed right contactor coil FRCC comprises a lead 153 connected to the lead 105 intermediate the switch SRS and the stationary contact 92, and extending to the stationary contact 64 and having incorporated therein the normally closed switch FAS3 of the feed motor arresting relay, a lead 154 connecting contacts 64 and 60, movable contact 72 adapted to bridge contacts 60 and 61, and a lead 155 extending from stationary contact 61 to the line wire L3 and having incorporated therein the normally closed switch FLCS of the feed left contactor and the feed right contactor coil FRCC. The energizing circuit for the coil TCC of the traverse contactor comprises a lead 156 branching from the lead 155 at a point beyond the feed left contactor switch FLCS and extending to the stationary contact 62, movable contact 68 adapted to bridge contacts 62 and 63, and lead 157 extending from the contact 63 to the line wire L3 and having incorporated therein the coil TCC.

An energizing circuit for the feed left contactor coil FLCC is common with the energizing circuit for the feed right contactor coil to the stationary contact 64. From that point the energizing circuit includes the movable contact 73 adapted to bridge contacts 64 and 65, and lead 158 extending from the stationary contact 65 to the line wire L3 and having incorporated therein the normally closed switch FRCS and the coil FLCC. An initiating circuit for the traverse contactor coil TCC, when the unitary controller is swung to its traverse left position, is formed by a lead 159 branching from the lead 158 at a point beyond the switch FRCS and connected to the stationary contact 66, movable contact 69 adapted to bridge contacts 66 and 67, and a lead 160 interconnecting the contacts 67 and 63 from whence the circuit is completed by the lead 157 containing the coil TCC.

A holding circuit for the feed right contactor coil FRCC is formed by a lead 161 connected at one end to the lead 153 at a point 162 intermediate the switch FAS3 and the contact 64, and at the other end to the lead 155 intermediate the contact 61 and the switch FLCS. This lead has incorporated therein the normally open switch HRS1 of the holding relay. A holding circuit for the feed left contactor coil FLCC is formed by a lead 163 connected at one end to lead 161 intermediate point 162 and switch HRS1, and connected at the other end to the lead 158 intermediate the contact 65 and the switch FRCS. This lead 163 has incorporated therein the normally open switch HRS2 of the holding relay.

An energizing circuit for the coil HRC of the holding relay is formed by a lead 165 extending from the lead 100 at a point intermediate the switch 102 and the contact 95 to the line wire L3 and having incorporated therein in the order named the limit switch LS, the normally closed switch FAS2 of the feed motor arresting relay, and the coil HRC. The coils TRC and FAC of the timer relay and the feed motor arresting relay, respectively, are connected in parallel sub-circuits composed of parallel leads 167 and 168, connected at one end to lead 165 intermediate the switch LS and the switch FAS2, and connected at the other end to line wire L3, and having incorporated therein, respectively, the switch MRS of the magnetic relay and the coil FAC and the switch FAS1 of the feed motor arresting relay and the coil TRC. In order that closure of the normally open switch MRS may serve to energize both coils TRC and FAC, the leads 167 and 168 are connected by a lead 169 at points, respectively, intermediate the switch and the coils in the leads 167 and 168. Completing the circuit is a lead 170 connected at one end to lead 153 intermediate point 162 and switch FAS3, and at the other end to lead 105 intermediate stationary contact 92 and switch SRS. This lead has incorporated therein the switch TRS' of the timer relay and serves to complete a circuit about the then open switch FAS3 at the end of the dwell to initiate movement of the carriage 11 in the opposite direction.

It is believed that the initial steps in the operation of the system, and particularly the tracing of the circuits in the various stages, will be readily understood and effected from the above description of the circuits and the description of the operation for the preceding two forms of the invention. The operation will, therefore, be described only from a point just prior to the time that the dog D4 closes the limit switch LS. With that assumption, the carriage 11 will now be moving to the right at a feed rate. As the dog D4 closes the limit switch LS, an energizing circuit for the coil HRC of the holding relay will be completed and hence the normally open switches HRS1 and HRS2 of the relay will be closed. Such closing of the switch HRS1 will complete the holding circuit for the feed right contactor coil FRCC around the unitary controller for the same purpose as in the other forms of the invention. Simultaneously, the normally closed switch HRS3 of the holding relay will be opened, thereby disrupting the shunt around the magnetic relay MR and rendering the same responsive to the current supplied to the feed motor and hence to the load on the feed motor. Following closure of the limit switch LS, the dog D1 will engage the follower 80 and rock the shaft 71 of the unitary controller to its extreme left position, as viewed in Fig. 1, that is, to its traverse left. This will, of course, break the initial circuit to the feed left contactor coil at the switch 60, 72, 61, but the feed motor will continue to operate because a holding circuit had previously been established by the switch HRS1, as already described. The movable contacts 69 and 73 will engage their respective stationary contacts to precondition circuits to the traverse contactor coil TCC and the feed left contactor coil FLCC, but nothing occurs because the feed right contactor switch FRCS is open.

Ultimately the positive stop screw 130 of the carriage strikes the base 10 of the machine and thus positively arrests the carriage and holds the same against further movement to the right. As a result, an overload will immediately be placed upon the feed motor, causing the instantaneous magnetic relay MR to trip. Such tripping of the magnetic relay will close the switch MRS and thus will complete an initial energizing circuit to the coils TRC and FAC of the timer relay and the feed motor arresting relay. Immediately, the normally open switch FAS1 of the feed motor arresting relay will close, thus establishing a holding circuit for both the coils TRC and FAC. Also immediately the normally closed switches FAS2 and FAS3 of the feed motor arresting relay will open. The former of these, being in the circuit for the holding relay coil HRC, will cause that relay to be deenergized with resultant opening of the switches HRS1 and HRS2. Opening of the switch HRS1 will break the holding circuit to the feed right contactor coil FRCC, and thus permit the same to return to normal position which will arrest operation of the feed motor.

With the return of the feed right contactor to its normal position, the normally closed switch FRCS thereof will be closed which would then complete the preconditioned circuits to the coils of the traverse contactor and feed left contactor, save for the fact that the switch FAS3 is now open and remains open until the limit switch LS is again opened as a result of movement of the carriage in the opposite direction, that is, to the left. After an interval of time adjusted to give the desired dwell, the timer relay closes its normally open contact TRS' and a circuit is then completed to the coils FLCC and TCC of the feed left and traverse contactors. This circuit may be traced as follows: Line wire L1, lead 100, contacts 86, 88, 86, 105 including switch SRS which is closed, lead 170 which includes the now closed timer relay switch TRS', lead 153, contacts 64, 73, 65, and lead 158 to line wire L3. The circuit for the traverse contactor coil TCC being traced as above to the lead 158 and thence through lead 159, contacts 66, 69, 67, and leads 160 and 157 to line wire L3. With energization of the coils FLCC and TCC, their respective contactors will be closed causing operation of both the feed and the traverse motors in a direction to drive the carriage in a reverse movement, that is, to the left, as viewed in Fig. 1. The carriage will be arrested by the dog D3 striking the follower 95 to open the automatic stop switch 93, 92 through the medium of the plunger 94.

I claim as my invention:

1. In a machine having a reciprocable carriage, means for driving the carriage through a cycle of movement including electric motor means operable to drive the carriage in opposite directions and means for positively limiting movement of the carriage in one direction, an electrical control system comprising means controlling operation of the motor means to obtain movement of the carriage in one direction, means operable as the carriage approaches the limit of its movement in the one direction to precondition the system for movement of the carriage in the opposite direction while maintaining movement in the first direction, means operable while the carriage engages the positive limit means to discontinue drive of the carriage by the motor means in the one direction, and timing means operable after a predetermined dwell of the carriage to initiate movement thereof in the opposite direction.

2. In a machine having a reciprocable carriage, reversible electric motor means operable to drive the carriage in opposite directions and means for positively limiting movement of the carriage in one direction, an electrical control system comprising means controlling operation of the motor means including a controller having a first position determining movement of the carriage in one direction and a second position determining movement of the carriage in the opposite direction, means operable as the carriage approaches the limit of its movement in the one direction to take over the direction of movement control from said controller, means subsequently operable to shift said controller to its second position to precondition circuits for effecting movement of the carriage in the opposite direction while the carriage continues to move in the one direction, means operable as the carriage strikes the positive limit means to discontinue drive of the carriage by the motor means in the one direction, and timing means operable after a predetermined dwell of the carriage to restore direction of movement control to the controller and initiate movement of the carriage in the opposite direction.

3. In a machine having a reciprocable carriage, reversible electric motor means operable to drive the carriage in opposite directions and means for positively limiting movement of the carriage in one direction, an electrical control system comprising a left contactor and a right contactor for determining the direction of rotation of the motor means, an actuating coil for each of said contactors, an energizing circuit for each coil, a controller having a pair of switches interconnected to have one open while the other is closed, one of which is connected in the energizing circuit for the coil of the left contactor and the other of which is connected in the energizing circuit for the coil of the right contactor, said controller normally determining the direction of movement of the carriage, a relay having an actuating coil and a pair of normally open switches each connected in a shunt circuit about the switches of the controller, means operable as the carriage approaches the limit of its movement in the one direction to actuate said relay and establish a holding circuit for the contactor coil then energized, means operable subsequently thereto and before the carriage reaches the limit of its movement in the one direction to shift the controller to precondition a circuit for energization of the other contactor coil, means operable as the carriage strikes the positive limit means to discontinue drive of the carriage by said motor means in the one direction, and timing means operable after a predetermined dwell of the carriage to render effective the preconditioned circuit for the other contactor coil to inititate movement of the carriage in the opposite direction.

4. In a machine having a reciprocable carriage, means for driving the carriage at feed and traverse rates and in opposite directions including electric motor means and means for positively limiting movement of the carriage in one direction, an electrical control system comprising means controlling operation of the motor means to obtain movement of the carriage in one direction at a feed rate, means operable as the carriage approaches the limit of its movement in the one direction to precondition the system for movement of the carriage in the opposite direction at a traverse rate while maintaining movement in the first direction at a feed rate, means operable as the carriage strikes the positive limit means to discontinue drive of the carriage by said motor means in the one direction, and timing means operable after a predetermined dwell of the carriage to initiate movement thereof in the opposite direction at a traverse rate.

5. In a machine having a reciprocable carriage, a positive mechanical stop for limiting movement of the carriage in one direction and means for driving the carriage at feed and traverse rates and in opposite directions including a first reversible electric motor, a second reversible electric motor, a planetary gear system operatively interposed between the motors and the carriage to drive the carriage at a feed rate when only the first motor is operating and at a traverse rate when the second motor is operating, normally applied brake means holding the second motor against rotation and solenoid means operable when energized to release the brake means, an electrical control system comprising means controlling operation of the motors to obtain movement of the carriage in one direction, means operable as the carriage approaches the limit of its movement in one direction to precondition said last mentioned means for reverse movement of the carriage while maintaining movement in the first direction, means operable when the carriage strikes the positive stop to energize the solenoid, thus releasing said brake and causing the first motor to drive the second motor instead of the carriage, and timing means initiating drive of the carriage in the opposite direction under the control of said preconditioned means.

6. In a machine having a reciprocable carriage, a positive mechanical stop for limiting movement of the carriage in one direction and means for driving the carriage at feed and traverse rates and in opposite directions including a first reversible electric motor, a second reversible electric motor, a planetary gear system operatively interposed between the motors and the carriage to drive the carriage at a feed rate when only the first motor is operating and at a traverse rate when the second motor is operating, an electrical control sytsem comprising a feed left contactor and a feed right contactor for determining operation of the feed motor and the direction of rotation of both motors, a traverse contactor for determining operation of the traverse motor, an actuating coil for each of said contactors, an energizing circuit for each coil, a controller having a first pair of switches mechanically interconnected for alternately closing the energizing circuit for the coil of the left contactor and the energizing circuit for the coil of the right contactor, and a second pair of switches connected in parallel in the energizing circuit for the coil of the traverse contactor, a relay having an actuating coil and a pair of normally open switches connected respectively in shunt circuits about the first pair of switches of the controller, means operable as the carriage approaches the limit of its movement in one direction to actuate said relay and establish a holding circuit for the feed contactor coil then energized to maintain movement of the carriage in the same direction at a feed rate, means operable subsequently thereto and before the carriage reaches the limit of its movement in the one direction to shift the controller to precondition circuits for energization of the traverse contactor coil and the other one of the direction determining feed contactor coils, means operable as the ca riage strikes the positive stop to render the first motor ineffective to drive of the carriage in the one direction, and timing means operable after a predetermined dwell of the carriage to render effective the circuits preconditioned by the controller to initiate movement of the carriage in the opposite direction at a traverse rate.

7. In a machine having a reciprocable carriage, a positive mechanical stop for limiting movement of the carriage in one direction and means for driving the carriage at feed and traverse rates and in opposite directions including a first reversible electric motor, a second reversible electric motor, a planetary gear system operatively interposed between the motors and the carriage to drive the carriage at a feed rate when only the first motor is operating and at a traverse rate when the second motor is operating, normally applied brake means holding the second motor against rotation and solenoid means operable when energized to release the brake means, an electrical control system comprising means adjustable to cause operation of the feed motor only to obtain movement of the carriage in one direction at a feed rate, means operable as the carriage approaches the limit of its movement in the one direction to condition said last mentioned means for operation of both the feed and the traverse motors in a direction to cause reverse movement of the carriage while maintaining movement of the carriage at a feed rate in the first direction, means operable while the carriage is stopped by the positive stop to energize said solenoid to release the brake means permitting the feed motor to drive the traverse motor instead of the carriage, and timing means operable to terminate operation of the feed motor in the initial direction and initiate reverse movement of the carriage at a traverse rate under control of said adjustable means.

8. In a machine having a reciprocable carriage, a positive mechanical stop for limiting movement of the carriage in one direction and means for driving the carriage at feed and traverse rates and in opposite directions including a first reversible electric motor, a second reversible electric motor, a planetary gear system operatively interposed between the motors and the carriage to drive the carriage at a feed rate when only the first motor is operating and at a traverse rate when the second motor is operating, normally applied brake means holding the second motor against rotation, an electrical control system comprising means adjustable to cause operation of the feed motor only to obtain movement of the carriage in one direction at a feed rate, switch means operable as the carriage approaches the limit of its movement in the one direction to readjust said last mentioned means for operation of both the feed and the traverse motors in a direction to cause reverse movement of the carriage while maintaining movement of the carriage at a feed rate in the first direction, means operable as the carriage strikes the positive stop to release the brake means permitting the feed motor to drive the traverse motor instead of the carriage, and timing means set into operation when the carriage strikes the positive stop to determine the time of initiation of reverse movement of the carriage at a traverse rate under control of said readjusted means.

9. In a machine having a reciprocable carriage, a positive mechanical stop for limiting movement of the carriage in one direction and means for driving the carriage at feed and traverse rates and in opposite directions including a first reversible electric motor, a second reversible electric motor, a planetary gear system operatively interposed between the motors and the carriage to drive the carriage at a feed rate when only the first motor is operating and at a traverse rate when the second motor is operating, normally applied brake means holding the second motor against rotation and solenoid means operable when energized to release the brake means, an electrical control system including a rate and direction controller adjustable to cause operation of the feed motor only to obtain movement of the carriage in one direction at a feed rate, means operable as the carriage approaches the limit of its movement in the one direction to adjust said controller to precondition circuits for operation of both the feed and the traverse motors in a direction to cause reverse movement of the carriage at a traverse rate while maintaining movement of the carriage at a feed rate in the one direction, an overload relay, said means being also operable to render said overload relay responsive to the load on the feed motor, said overload relay in response to the overload on the feed motor caused by arrest of the carriage by the positive stop causing energization of the solenoid means to release the brake means for the traverse motor permitting the feed motor to drive the traverse motor instead of the carriage, and timing means also set into operation by said overload relay operating after a predetermined dwell of the carriage to initiate reverse movement of the carriage at a traverse rate.

10. In a machine having a reciprocable carriage, a positive mechanical stop for limiting movement of the carriage in one direction and means for driving the carriage at feed and traverse rates and in opposite directions including a first reversible electric motor, a second reversible electric motor, a planetary gear system operatively interposed between the motors and the carriage to drive the carriage at a feed rate when only the first motor is operating and at a traverse rate when the second motor is operating, normally applied brake means holding the second motor against rotation, an electrical control system including a rate and direction controller adjustable to cause operation of the feed motor only to obtain movement of the carriage in one direction at a feed rate, means operable as the carriage approaches the limit of its movement in the one direction to adjust said controller to precondition circuits for operation of both the feed and the traverse motors in a direction to cause reverse movement of the carriage at a traverse rate while maintaining movement of the carriage at a feed rate in the one direction, the arrest of the carriage by said positive stop causing an overload on the feed motor, means responsive to such overload on the feed motor to release the brake on the traverse motor, and timing means set into operation by said feed motor overload responsive means and operating after a predetermined interval to initiate reverse movement of the carriage at a traverse rate.

11. In a machine having a reciprocable carriage, a positive mechanical stop for limiting movement of the carriage in one direction and means for driving the carriage at feed and traverse rates and in opposite directions including a first reversible electric motor, a second reversible electric motor, a planetary gear system operatively interposed between the motors and the carriage to drive the carriage at a feed rate when only the first motor is operating and at a traverse rate when the second motor is operating, normally applied brake means holding the second motor against rotation, an electrical control system including a rate and direction controller adjustable to cause operation of the feed motor only to obtain movement of the carriage in one direction at a feed rate, a first means operable as the carriage approaches the limit of its movement in the one direction temporarily to remove rate and direction control from said controller and to maintain movement of the carriage at a feed rate in the one direction while permitting adjustment of said controller to precondition circuits for operation of both the feed and the traverse motors in a direction to cause reverse movement of the carriage at a traverse rate, the arrest of the carriage by said positive stop causing an overload on the feed motor, means rendered responsive to such overload on the feed motor by said first means to release the brake on the traverse motor, and timing means set into operation by said feed motor overload responsive means and operating after a predetermined interval to restore rate and direction control to said controller to initiate reverse movement of the carriage at a traverse rate.

12. In a machine having a reciprocable carriage, a positive mechanical stop for limiting movement of the carriage in one direction and means for driving the carriage at feed and traverse rates and in opposite directions including a first reversible electric motor, a second reversible electric motor, a planetary gear system operatively interposed between the motors and the carriage to drive the carriage at a feed rate when only the first motor is operating and at a traverse rate when the second motor is operating, normally applied frictional brake means resisting rotation of the second motor, solenoid means connected in parallel with the second motor operable to release the frictional brake means when the second motor is energized, mechanical latching means positively holding the second motor against rotation and a second solenoid means operable when energized to release the mechanical latching means, an electrical control system comprising switch means adjustable to cause operation of the feed motor only to obtain movement of the carriage in one direction at a feed rate, means operable as the carriage approaches the limit of its movement in the one direction to adjust said switch means for operation of both the feed and the traverse motors in a direction to cause reverse movement of the carriage while maintaining movement of the carriage at a feed rate in the one direction, said last mentioned means being simultaneously operable to energize the second solenoid to release the mechanical latching means to permit the feed motor in opposition to said brake to drive the traverse motor when the carriage movement in the one direction is limited by the positive stop, and timing means also initiated by said last mentioned means operable to render said adjusted switch means effective to cause reverse movement of the carriage at a traverse rate.

13. In a machine having a reciprocable carriage, a positive mechanical stop for limiting movement of the carriage in one direction and means for driving the carriage at feed and traverse rates and in opposite directions including a first reversible electric motor, a second reversible electric motor, and a planetary gear system operatively interposed between the motors and the carriage to drive the carriage at a feed rate when only the first motor is operating and at a traverse rate when the second motor is operating, an electrical control system including a rate and direction controller adjustable to cause operation of the feed motor only to obtain movement of the carriage in one direction at a feed rate, means operable as the carriage approaches the limit of its movement in the one direction to adjust said controller to precondition circuits for operation of both the feed and the traverse motors in a direction to cause reverse movement of the carriage at a traverse rate while maintaining movement of the carriage at a feed rate in the one direction, means responsive to an overload on the feed motor when the carriage engages said positive stop, said means operating to arrest said motor, and timing means set into operation by said feed motor overload responsive means and operating after a predetermined interval to initiate reverse movement of the carriage at a traverse rate under the control of said preconditioned circuits.

14. In a machine having a reciprocable carriage, a positive mechanical stop for limiting movement of the carriage in one direction and means for driving the carriage at feed and traverse rates and in opposite directions including a first reversible electric motor, a second reversible electric motor, and a planetary gear system operatively interposed between the motors and the carriage to drive the carriage at a feed rate when only the first motor is operating and at a traverse rate when the second motor is operating, an electrical control system including a rate and direction controller adjustable to cause operation of the feed motor only to obtain movement of the carriage in one direction at a feed rate, means operable as the carriage approaches the limit of its movement in the one direction to adjust said controller to precondition circuits for operation of both the feed and the traverse motors in a direction to cause reverse movement of the carriage at a traverse rate while maintaining movement of the carriage at a feed rate in the one direction, an overload relay, said means being also operable to render said overload relay responsive to the load on the feed motor, said overload relay in response to the overload on the feed motor caused by arrest of the carriage by the positive stop operating to discontinue drive of the carriage by the motor, and timing means also set into operation by said overload relay operating after a predetermined dwell of the carriage to initiate reverse movement of the carriage at a traverse rate under control of said preconditioned circuits.

15. In a machine having a reciprocable carriage, means for driving the carriage through a cycle of movement including electric motor means operable to drive the carriage in opposite directions and means for positively limiting movement of the carriage in one direction, an electrical control system comprising a first means controlling operation of the motor means to obtain movement of the carriage in one direction, said first means being adjustable to cause the motor means to drive the carriage in the opposite direction, a second means operable as the carriage approaches the limit of its movement in one direction to permit such adjustment of said first means while maintaining movement of the carriage in the one direction, means subsequently operable to effect the adjustment of the first means, means operable as the carriage strikes the positive limit means to arrest operation of the motor means, and timing means operable after a predetermined dwell of the carriage to initiate movement of the carriage as predetermined by said first mentioned means.

16. In a machine having a reciprocable carriage, a positive mechanical stop for limiting movement of the carriage in one direction and means for driving the carriage at feed and traverse rates and in opposite directions including a first reversible electric motor, a second reversible electric motor, and a planetary gear system operatively interposed between the motors and the carriage to drive the carriage at a feed rate when only the first motor is operating and at a traverse rate when the second motor is operating, an electrical control system including a rate and direction controller adjustable to cause operation of the feed motor only to obtain movement of the carriage in one direction at a feed rate, means operable as the carriage approaches the limit of its movement in the one direction to adjust said controller to precondition circuits for operation of both the feed and the traverse motors in a direction to cause reverse movement of the carriage at a traverse rate while maintaining movement of the carriage at a feed rate in the one direction, an overload relay, said means being also operable to render said overload relay responsive to the load on the feed motor, said overload relay in response to the overload on the feed motor caused by arrest of the carriage by the positive stop arresting operation of the motor, and timing means also set into operation by said overload relay operating after a predetermined dwell of the carriage to initiate reverse movement of the carriage at a traverse rate.

17. In a machine having a reciprocable carriage, a positive mechanical stop for limiting movement of the carriage in one direction and means for driving the carriage at feed and traverse rates and in opposite directions including a first reversible electric motor, a second reversible electric motor, and a planetary gear system operatively interposed between the motors and the carriage to drive the carriage at a feed rate when only the first motor is operating and at a traverse rate when the second motor is operating, an electrical control system including a rate and direction controller adjustable to cause operation of the feed motor only to obtain movement of the carriage in one direction at a feed rate, a first means operable as the carriage approaches the limit of its movement in the one direction temporarily to remove rate and direction control from said controller and to maintain movement of the carriage at a feed rate in the one direction while adjusting said controller to precondition circuits for operation of both the feed and the traverse motors in a direction to cause reverse movement of the carriage at a traverse rate, means rendered responsive to an overload on the feed motor by said first mentioned means to arrest operation of both motors, and timing means set into operation by said feed motor overload responsive means and operating after a predetermined interval to restore rate and direction control to said controller thereby causing reverse movement of the carriage at a traverse rate.

BERTIL T. ANDERSON.

Certificate of Correction

Patent No. 2,398,346.       April 16, 1946.

BERTIL T. ANDERSON

It is hereby certified that errors appear in the printed specification of the above numbered patent requiring correction as follows: Page 10, first column, line 18, before "105 including", insert *lead*; and page 12, second column, lines 36–37, claim 12, strike out the words "in opposition to said brake" and insert the same after "motor" in line 37 of the same claim; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.*